June 8, 1926.
E. W. ELROD
1,588,177
TANDEM COUPLED DISK HARROW
Filed April 10, 1925   3 Sheets-Sheet 1
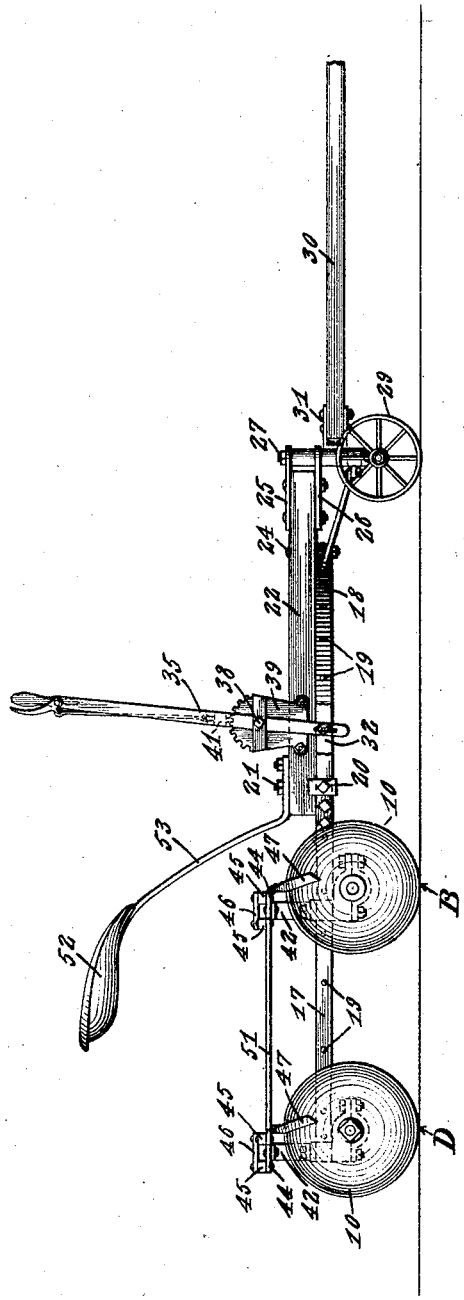
INVENTOR.
E. W. Elrod,
BY
Geo. P. Kimmel. ATTORNEY.

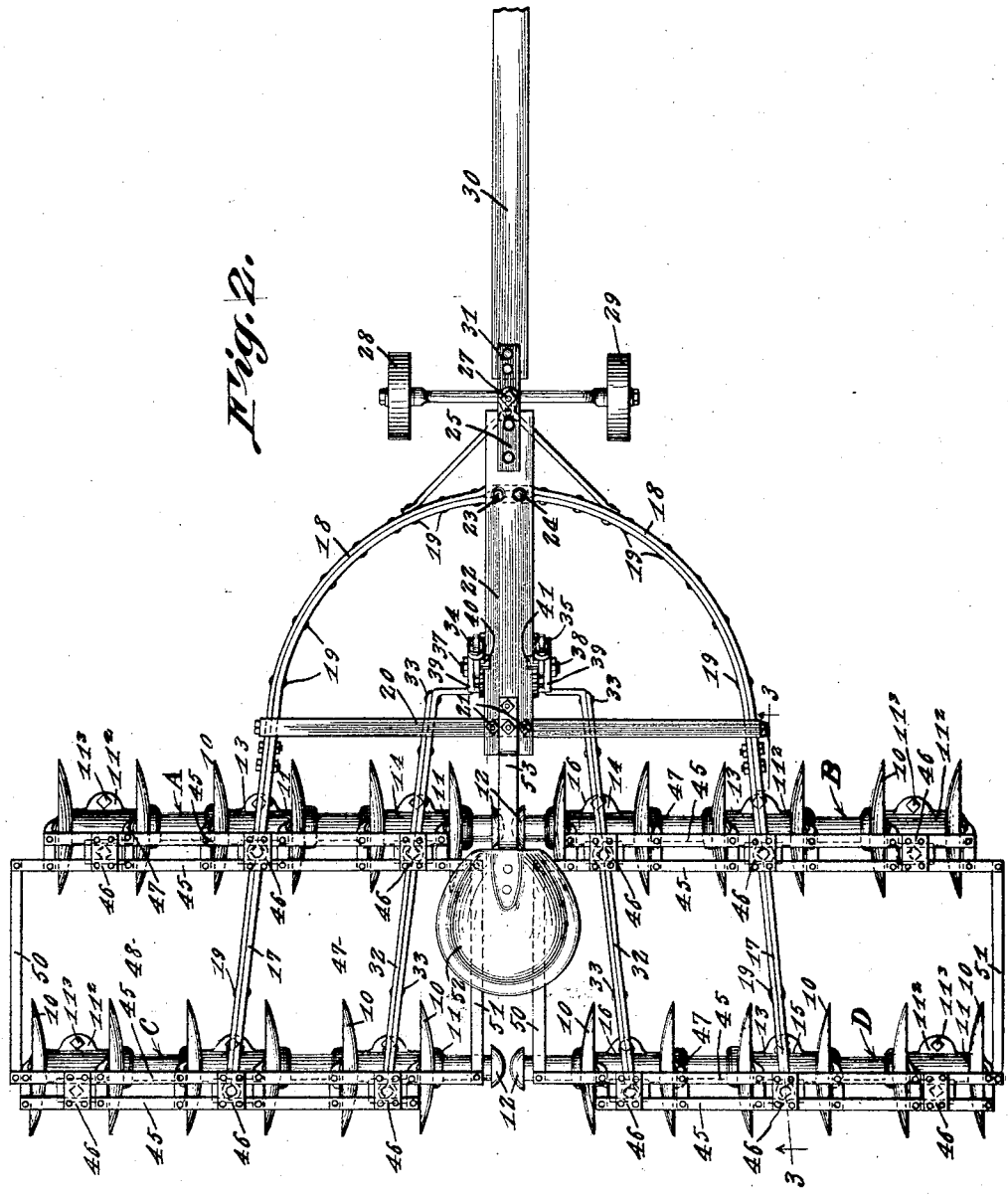

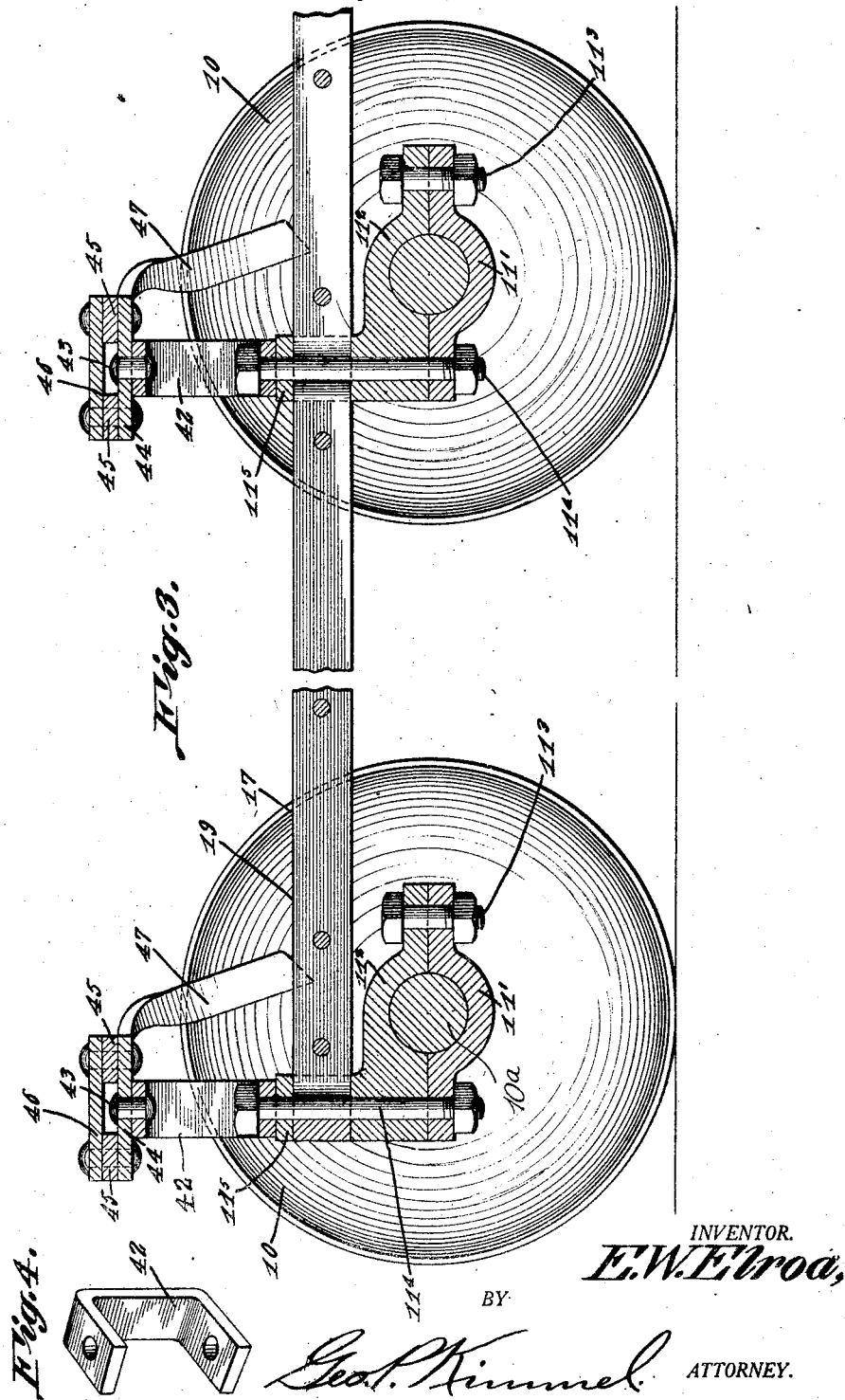

Patented June 8, 1926.

1,588,177

UNITED STATES PATENT OFFICE.

EDDY WARREN ELROD, OF LAFONTAINE, KANSAS.

TANDEM-COUPLED DISK HARROW.

Application filed April 10, 1925. Serial No. 22,170.

This invention relates to disk harrows, and has for one of its objects to produce a device of this character adapted more particularly to break up the small ridges remaining after the ordinary harrow has passed over the field.

Another object of the invention is to improve and simplify the construction and increase the efficiency and utility of devices of this character.

With these and other objects in view, the invention consists in certain novel features of construction as hereinafter shown and described and then specifically pointed out in the claims, and in the drawings illustrative of the preferred embodiment of the invention.

Fig. 1 is a side elevation, and

Fig. 2 is a plan view, of the improved device.

Fig. 3 is an enlarged sectional detail on the line 3—3 of Fig. 2.

Fig. 4 is an enlarged detached perspective view on one of the scraper frame supports.

The improved device includes a forward and rear series of disk harrow units, and as these units are substantially alike the detailed description of one will suffice for all. For the purpose of illustration four of the disk units are shown, two forward and two rear units, the several units being designated, respectively, by the characters A—B—C and D, the units A and B being the forward units and the units C and D being the rear units.

Each of the harrow units comprises a plurality of concavo convex disk elements 10 coupled by stocks or shanks 11 mounted upon shafts $10^a$.

The confronting ends of the innermost stock of each of the disk units is enlarged and rounded to form buffer elements as shown at 12, to retain the units in operative position and prevent overlapping when adjusted.

A plurality of the shanks 11 of each section are replaced by bearings as shown in Fig. 3, the latter including a lower portion $11^1$ and a cap portion $11^2$ connected by holding bolts $11^3$ and $11^4$. Each of the caps $11^2$ is formed with an upwardly directed keeper $11^5$, and the rear bolt $11^4$ is extended upward through the upper portion of the keeper, as shown.

Three of these bearings are employed in each of the sections, one near each end, and one intermediate the ends.

A substantially J-shaped forwardly extending supporting frame is coupled to the rear bolt $11^4$ of each of the intermediate bearings, the frame being formed of flat bars 17, oblong transversely, and bent upon themselves and engaging the bolts $11^4$ at the bends of the frame and within the keeper $11^5$ of the rear units and passing forwardly through the keepers $11^5$ of the forward units and spread apart to engage the pivot bolts $11^4$ of the forward units, and united by rivets 19 or by other fastening devices.

The sides of the supporting frame 17 are coupled by a transverse stay member 20, and connected at 21 to the stay member is a beam member 22. The beam member extends forwardly and is provided with upper and lower straps 25—26, and pivoted at 27 between the straps are caster wheels 28—29.

The forward or curved portions 18 of the members 17 extend inwardly in end opposed relation as indicated and are secured to the underside of the beam 22 adjacent its forward end by the bolts 23 and 24.

The draft tongue is represented at 30, and is coupled at 31 to the caster wheel frame.

By this arrangement the disk harrow units are supported to swing upon the rear bolts $11^4$ of the intermediate bearing.

Operating members are provided to effect the swinging of the harrow units upon their pivots, each comprising a lever arm represented as a whole at 32, and connecting members each formed of a bar oblong transversely and bent intermediate the ends and engaging the rear bolts $11^4$ of the inner bearings and within the keepers $11^5$ of the rear units and extending forwardly through the keepers $11^5$ of the forward units and distended to form bearings to engage the rear bolts $11^4$ of the inner bearings of the forward units, the parts of the members 32 being united by rivets 33, or other suitable fastening devices.

At their forward ends the members 32 are directed inwardly and pivoted respectively to the lower ends of operating levers 34 and 35, the latter in turn pivoted at 36—37 to toothed standards 38—39 attached to the beam member 22.

The levers 34 and 35 are provided with pawl devices 40 and 41 to respectively engage the teeth of the standards to lock the members 32 in adjusted position.

By this arrangement the disk units A and C may be simultaneously adjusted on the bolts 11⁴ of the intermediate bearings and the disk units B and D likewise adjusted upon the like bolts.

The disks of the rear units are disposed in alinement with the spaces between the disks of the forward disk units, so that they cut and level the ridges left between the disks of the forward units, thus eliminating the ridges and thoroughly levelling and pulverizing the soil, and by adjusting the disk units to a greater or lesser degree of angularity the distance between the ridges may be effectually controlled.

Attached to each of the keepers 11⁵ by the rear bolt 11⁴ of each bearing, is a U-shaped clip 42, one of which is shown detached in Fig. 4. Coupled at 43 to each of the clips 42 is a clamp bar 44, and connected to each set of the clamp bars are spaced supports 45, the supports corresponding in length substantially to the disk units, as shown in Fig. 1.

Upper clamp bars 46 are riveted to the lower clamp bars through the members 45, as shown, and attached to the lower faces of the bars 45, adjacent to each of the disks 10, is a scraper element 47, to remove adhering matter from the disks as they rotate.

The confronting bars 45 are coupled at the ends by pivoted rods 50 and 51, so that they move in unison with the disk units.

The driver's seat is represented at 52 and supported by the usual standard 53 from the beam member 22, the operating levers 34 and 35 being located in convenient position to the driver on the seat.

By this simple arrangement the four sets of disk units may be easily adjusted from the driver's seat, and the units at each side of a medial line adjustable independently of those at the other side.

The disks may thus be readily adapted to the condition or constituency of the soil and the latter thoroughly pulverized and the ridges eliminated.

The improved device is simple in construction, can be made of any size and of any suitable material or combination of materials.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described my invention what I claim as new is:—

1. In a harrow of the character set forth, a center beam, draft means pivotally connected thereto, a pair of substantially J-shaped members having the free ends of the curved portions secured in end opposed relation to said beam and having the shank thereof directed rearwardly in divergent relation, a plurality of multiple disk units positioned rearwardly of said beam and arranged in tandem beneath and centrally transversed by the shank of each member, means for pivotally connecting each unit intermediate its ends to the adjacent overlying shank, a connecting member extending across the rear of said beam and secured at its ends to said shank adjacent the point of merger of the shank with said curved portion, an actuating bar common to and pivotally connected to the inner ends of each of the tandem units, means carried on said beam and connected to each bar for controlling the same, a beam overlying and extending longitudinally of each of the units, and bars pivotally connecting the ends of said overlying beams of each tandem unit together.

2. A harrow of the character described, a center beam, a tandem series of multiple disk units on each side of said beam, bearing elements arranged between certain of said disks of each unit, each bearing carrying an upstanding arm constituting a keeper, a vertical bolt extending upwardly through the arm of each bearing, a rigid bar element extending through a keeper of a bearing of each unit and pivotally secured thereto by the bolt extending therethrough and common to the units of each tandem series, said bar element having one end secured to said beam, an actuating bar common to the units of each series and extending through a keeper of a bearing of each unit and pivotally secured thereto by the bolt extending therethrough, and means mounted upon said beam for controlling each actuating bar to swing the units on said rigid bars.

In testimony whereof, I affix my signature hereto.

EDDY W. ELROD.